Nov. 6, 1928.
O. C. TROUT
1,690,562
STOVEPIPE CASING COUPLING
Filed June 13, 1925    2 Sheets-Sheet 1
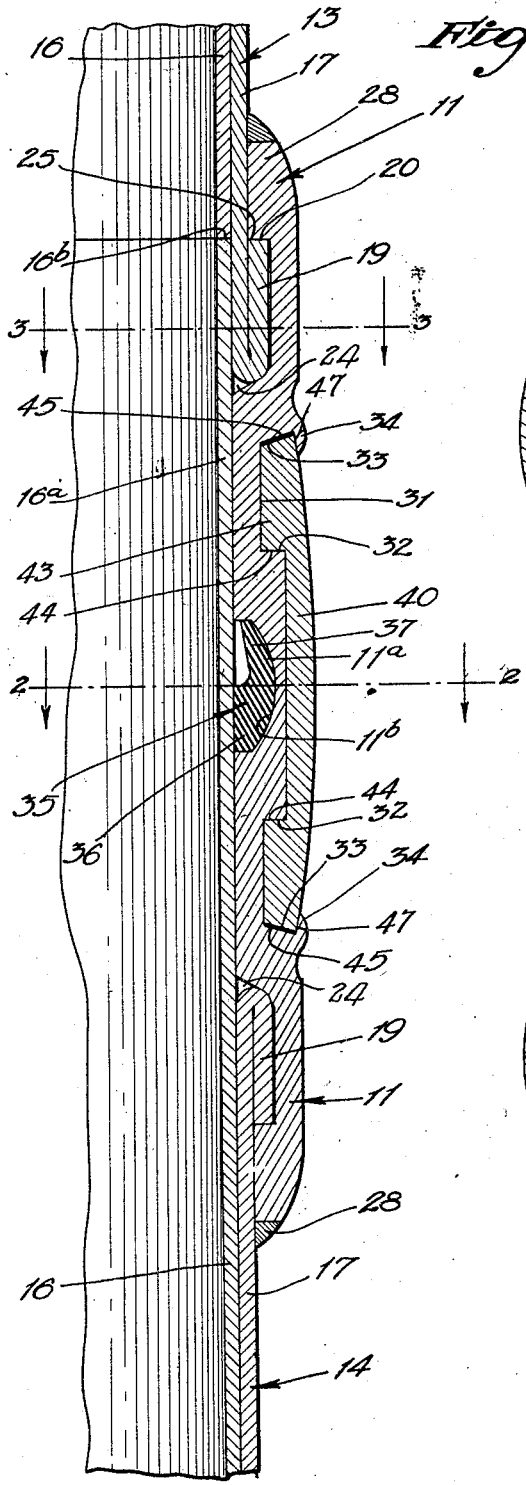
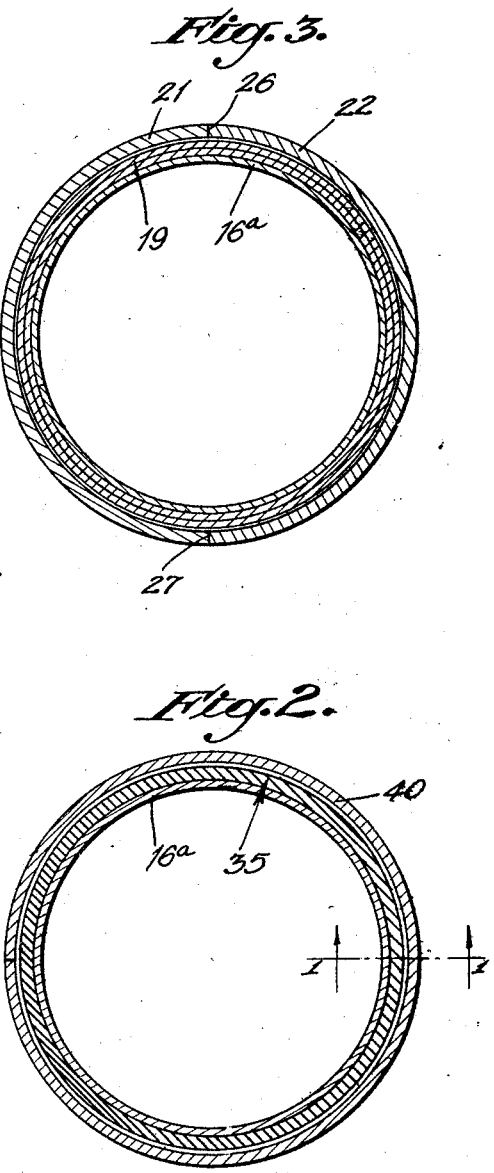
INVENTOR:
OLIVER C. TROUT,
BY
Fred W Lawie
ATTORNEY.

Nov. 6, 1928.
O. C. TROUT
STOVEPIPE CASING COUPLING
Filed June 13, 1925    2 Sheets-Sheet 2
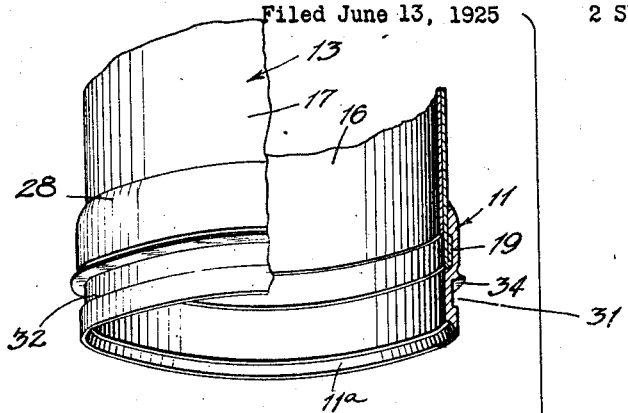
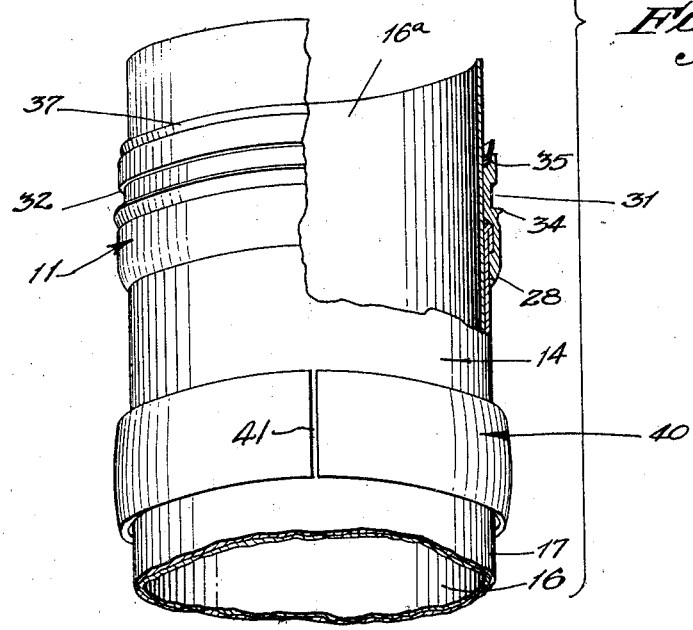
Fig. 4.
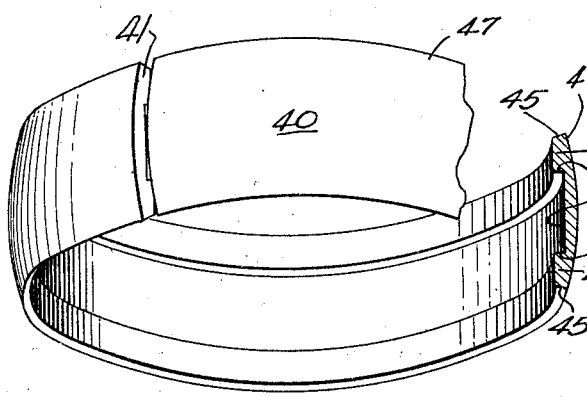
Fig. 5.
INVENTOR:
OLIVER C. TROUT,
BY
ATTORNEY.

Patented Nov. 6, 1928.

1,690,562

UNITED STATES PATENT OFFICE.

OLIVER C. TROUT, OF LOS ANGELES, CALIFORNIA, ASSIGNOR, BY MESNE ASSIGNMENTS, TO LOS ANGELES MANUFACTURING COMPANY, INC., OF LOS ANGELES, CALIFORNIA, A CORPORATION OF CALIFORNIA.

STOVEPIPE-CASING COUPLING.

Application filed June 13, 1925. Serial No. 36,841.

This invention relates to couplings for stovepipe casing such as is commonly used in the oil producing industry.

Two types of casing are commonly used in oil wells, namely, screw casing and stovepipe casing. Screw casing is made from wrought iron sheets rolled into cylindrical form which have the abutting edes thereof welded. The ends of these members are threaded and they are secured together by threaded couplings. Stovepipe casing is made from inner and outer cylindrical members which are made from sheet iron, these sheets being rolled into cylindrical shape, one outside the other. The ordinary screw type casing, although it is very satisfactory when installed, is very heavy and cumbersome to handle, and the first cost thereof is very great. Stove pipe casing is very light as compared with screw casing and is handled with facility. Further, stovepipe casing is much cheaper than screw casing. With stovepipe casing, difficulty is encountered with the couplings for securing them together. It is necessary that these couplings be sufficiently strong to endure strains placed upon the casing, that they be fluidtight, and that they can be installed in place in the field without the use of special tools or welding equipment.

It is an object of my invention to provide a coupling for stovepipe casing of this character which is absolutely fluidtight.

It is also an object of my invention to provide a coupling of this character which is simple in construction and very easy to install.

It is a still further object of my invention to provide a stovepipe coupling which is very strong and will endure all tensile strains placed thereupon.

Other objects and advantages of the invention will be made evident hereinafter.

Referring to the drawings in which I illustrate a preferred form of my invention, Fig. 1 is a fragmentary vertical sectional view of a stovepipe casing coupling, the coupling in this view being assembled and coupling a pair of stove-pipe casing members together.

Fig. 2 is a section taken on the line 2—2 of Fig. 1.

Fig. 3 is a section taken on the line 3—3 of Fig. 1.

Fig. 4 is a perspective view partially sectioned showing the flange members of my invention secured on the ends of casing members and showing the members in position for assembly.

Fig. 5 is a perspective view partially in section of the securing collar of the coupling of my invention.

The form of my invention shown in the drawings consists of a pair of flange members 11, these flange members being secured at the ends of stovepipe casing members 13 and 14. The stovepipe casing members 13 and 14 are laminated, or formed of a plurality of laminations such as the inner and outer layers of sheet metal 16 and 17 which are tubular and are telescoped and secured together as shown in the drawings. The ends of the outer members 17 are bent externally back upon the member 17 in a manner to provide an annular ridge 19 having a shoulder 20. The flange members 11 are each composed of sections 21 and 22 so that they may be installed in place. When these flanges are in place, the ridges 19 extend into inner annular channels 24 of the flange members 11, and the shoulders 20 engage with shoulders 25 formed in the channels 24. After the members 21 and 22 are placed on the casings 13 and 14, they are welded together at the abutting edges as indicated at 26 and 27 in Fig. 3. The ends 28 of the flange members 11 are then welded to the outer members 17 of the casings 13 and 14 as shown clearly in Fig. 1. The welding of the portions 21 and 22 together and the welding of the complete flanges 11 to the casing members serves to permanently secure them in place. Each of the flanges 11 has an outer annular channel 31 which provides shoulders 32 and 33. Adjacent to the shoulder 33 is an annular lip 34 which rests in a position as shown in Fig. 4 previous to the complete assembling of the casing coupling.

The casings 13 and 14 are arranged together so that a cylindrical projection 16ª of the inner tube 16 of the casing member 14 extends inside both of the flanges 11 and inside the end of the outer tube 17 of the casing member 13, the end of this cylindrical portion 16ª abutting against the end of the inner member 16 of the casing 13 as indicated at 16ᵇ. The ends of the flanges 11 are recessed at 11ª and when the flanges are arranged as in Fig. 1 these recesses cooperate to provide a gasket channel 11ᵇ. A gasket 35 formed from a suitable gasket material is arranged in the gasket channel 11ᵇ. This gasket member 35 has a main portion 36 and a lip portion 37.

A collar 40 which is split at 41 is arranged in place as shown in Fig. 1 after the sections 13 and 14 have been placed together. Head portions 43 extend into the channels 31 of the flanges 11, these head portions 43 having shoulders 44 and 45 which engage the shoulders 32 and 33 of the channels 31. The collar 40 is split so that it may be distorted to permit its installation. After the collar 40 is in place, the lips 34 are peened so that they extend over the edges 47 of the collar 40, thus securely retaining it in place.

The method of installing and assembling the coupling of my invention is substantially as follows:

The casing members 13 and 14 are first placed so as to provide the annular ridges 19 and so that the member 14 provides the cylindrical projection 16ᵃ. The portions 21 and 22 of the flanges 11 are then installed in place, as previously described, and are then securely welded in place. The gasket member 35 is then extended onto the cylindrical projection 16ᵃ so that the body portion 36 thereof rests in the annular recess 11ᵃ formed at the end of the flange 11 on the member 14. As shown in Fig. 4 the lip 37 of the gasket member 35 extends substantially parallel to the cylindrical extension 16ᵃ. The casings 13 and 14 are then brought into the position shown in Fig. 4 and are placed together so that the cylindrical extension 16ᵃ extends inside the flange 11 of the member 13 and so that the portion 16ᵃ abuts the end of the inner member 16 of the casing member 13 as indicated at 16ᵇ in Fig. 1. The face of the recess 11ᵃ of the flange member 11 which is arranged on the casing 13 engages the end of the lip 37 of the gasket 35, forcing it from the position shown in Fig. 4 into the position shown in Fig. 1. At this time the gasket 35 is partially compressed and is forced pressurably against the bottom of the channel 11ᵇ.

The collar 40 which is shown in detail in Fig. 1 is then installed in place. This collar is extended over either of the casings 13 or 14 before they are assembled together; the collar being split permits an enlargement for such positioning. The collar is moved into a position so that the head portions 43 will fall into the channels 31. The collar is then allowed to return to its natural position, at which time these head portions rest in the outer channels. The lips 34 are then peened over the edges 47 of the collar 40 as shown in Fig. 1, and the collar 40 is novelly retained in place by the lips 34. The coengagement between the shoulders 32 and 44 securely locks the flanges 11 and thus the casing sections 13 and 14 together. These shoulders provide a very strong locking means which is capable of enduring any strains placed upon a casing of this character while in use in an oil well.

The joint at the coupling is rendered absolutely fluidtight by the provision of the gasket 35. This gasket, being compressed against the bottom of the channel 11ᵇ, prevents leakage. If any fluid inside the casing should leak around the extension 16ᵃ it would enter the channel 11ᵇ and a pressure thereof would tend to force the gasket member 35 into greater pressurable contact with the bottom of the channel 11ᵇ, thus increasing its efficiency. The casing sections 13 and 14 and the flanges 11 are co-axially aligned at all times by the projection 16ᵃ.

My invention is very simple in its construction, comprising essentially four parts, two flange members, a gasket member and a collar. It is obvious that these parts can be cheaply produced and that such parts are very easy and quick to install.

I claim as my invention:

1. In a coupling for casing, the combination of: a pair of flanges, said flanges being secured to ends of casing members; a collar for securing said flanges together; and an annular lip formed on each of said flanges, said lips being adapted to engage said collar, thus securing same in place.

2. In combination: a pair of tubular members; annular ridges, one of said annular ridges being formed on each tubular member; a pair of flanges, one of said flanges being secured to each of said tubular members, each flange having a channel into which one of said ridges extends; a cylindrical projection extending inside said flanges and said ridges; and a collar extending around said flanges for securing them together, said collar having heads extending into outer channels formed in said flanges.

3. In a stovepipe well casing comprising primary and secondary sections, each of which has inner and outer tubes telescoped and secured together, the combination of: a female coupling member provided upon an end of said primary section and having a flange member secured upon the outer tube thereof so as to extend axially therebeyond; a male coupling member formed upon an end of said secondary section and having a flange member secured upon the outer tube thereof and a sleeve-like projection forming a continuation of the inner tube thereof and extending within and axially beyond said last-mentioned flange member, said male and female coupling members being adapted to fit together so that said male projection extends within said first-mentioned flange to align said flange members together; and a collar engaging outer surfaces of said flange members to unite these together.

4. In a stovepipe well casing comprising primary and secondary sections, each of which has inner and outer tubes telescoped and secured together, the combination of: a female coupling member provided upon an end of said primary section and having a flange member secured upon the outer tube thereof so as to extend axially therebeyond; a male coupling member formed upon an end of said secondary section and having a flange member secured upon the outer tube thereof and a sleeve-like projection forming a continuation of the inner tube thereof and extending within and axially beyond said last-mentioned flange member, said male and female coupling members being adapted to fit together so that said male projection extends within said first-mentioned flange member to align said flange members together; and a collar engaging outer surfaces of said flange members to unite these together, said flange members having collar securing portions which extend into restricting position relative to said collar.

5. In a casing comprising sections of laminated tubing, the combination of: a pair of flanges secured to adjacent ends of said sections upon the outer laminations thereof; a collar securing said flanges together; and a projection formed upon one of said sections by a continuation of the inner lamination thereof, said projection extending inside of said flanges to axially align the sections.

6. In a casing comprising sections of laminated tubing, the combination of: a pair of flanges secured to adjacent ends of said sections upon the outer laminations thereof; a collar securing said flanges together; and a projection formed upon one of said sections by a continuation of the inner lamination thereof, said projection extending inside of said flanges to axially align the sections and into an annular recess formed in the opposite end of said tubing by a discrepancy in the positions of the ends of adjacent laminations at said opposite end of said tubing.

7. In a stovepipe well casing, the combination of: a double-wall primary section having its outer wall extended beyond its inner wall to form an annular recess; a double-wall secondary section having its inner wall extended beyond its outer wall to form a centering projection inter-meshing with said recess of said primary section; annular flanges secured upon the outer wall of the respective sections, each of said flanges extending beyond the outer wall to which it is secured, whereby inner surfaces of both flanges closely contact the centering projection of the secondary section; and means for securing the flanges against axial separation.

8. In a stovepipe well casing, the combination of: a double-wall primary section having its outer wall extended beyond its inner wall to form an annular recess; a double-wall secondary section having its inner wall extended beyond its outer wall to form a centering projection inter-meshing with said recess of said primary section; annular flanges secured upon the outer wall of the respective sections, each of said flanges extending beyond the outer wall to which it is secured, whereby inner surfaces of both flanges closely contact the centering projection of the secondary section; a collar engaging both flanges to maintain the sections against axial separation; and means formed on the respective flanges to engage and prevent removal of said collar.

9. In a stovepipe well casing, the combination of: a double-wall primary section having its outer wall extended beyond its inner wall to form an annular recess and bent back upon itself to provide an annular ridge; a double-wall secondary section having its outer wall bent back upon itself to form an annular ridge and its inner wall extended beyond its outer wall to provide a centering projection engaging with the recess of the primary section; annular flanges secured upon the outer wall of the respective sections, each of said flanges having an internal channel into which the annular ridge of the respective section engages and each flange being extended beyond the outer wall to which it is secured whereby both flanges beyond said outer walls closely contact said centering projection of the primary section; and means for securing the flanges against axial separation.

10. In a stovepipe well casing, the combination of: a double-wall primary section having its outer wall extended beyond its inner wall to form an annular recess and bent back upon itself to provide an annular ridge; a double-wall secondary section having its outer wall bent back upon itself to form an annular ridge and its inner wall extended beyond its outer wall to provide a centering projection engaging with the recess of the primary section; annular flanges secured upon the outer wall of the respective sections, each of said flanges having an internal channel into which the annular ridge of the respective section engages and each flange being extended beyond the outer wall to which it is secured whereby both flanges beyond said outer walls closely contact said centering projection of the primary section; a collar engaging both flanges to maintain the sections against axial separation; and means formed on the respective flanges to engage and prevent removal of said collar.

In testimony whereof, I have hereunto set my hand at Los Angeles, California, this 3rd day of June, 1925.

OLIVER C. TROUT.